United States Patent [19]
Smith et al.

[11] Patent Number: 5,863,132
[45] Date of Patent: Jan. 26, 1999

[54] THRUST BEARING AND USE OF SAME WITH APPARATUS FOR REDUCING REPETITIVE STRESS INJURY

[75] Inventors: Jeffrey E. Smith, Howard Lake; Robert J. Crosson, New Brighton, both of Minn.

[73] Assignee: Idea Development, Engineering and Service, Inc., Minneapolis, Minn.

[21] Appl. No.: 879,174

[22] Filed: Jun. 20, 1997

Related U.S. Application Data

[62] Division of Ser. No. 514,660, Aug. 14, 1995, Pat. No. 5,657,956.

[51] Int. Cl.$^6$ ........................................ F16C 29/04
[52] U.S. Cl. ........................... 384/49; 384/50; 384/51; 384/609; 384/618
[58] Field of Search .................. 384/49, 50, 51, 384/609, 618, 614

[56] References Cited

U.S. PATENT DOCUMENTS

| | | |
|---|---|---|
| 1,135,155 | 4/1915 | Blundell . |
| 2,244,434 | 6/1941 | Shaw . |
| 2,828,589 | 4/1958 | Hercik . |
| 2,890,010 | 6/1959 | Barkheimer . |
| 2,895,770 | 7/1959 | Matthews . |
| 2,967,741 | 1/1961 | Bostelmann . |
| 3,471,668 | 10/1969 | Wilkes . |
| 3,501,212 | 3/1970 | Stenert et al. . |
| 3,615,068 | 10/1971 | Edelstein . |
| 3,813,491 | 5/1974 | Pennar . |
| 4,056,292 | 11/1977 | Traut . |
| 4,132,455 | 1/1979 | Binoth . |
| 4,276,786 | 7/1981 | Langenstein . |
| 4,297,913 | 11/1981 | Garbo . |
| 4,305,563 | 12/1981 | Presson . |
| 4,365,561 | 12/1982 | Tellier et al. . |
| 4,372,621 | 2/1983 | Farrant . |
| 4,441,432 | 4/1984 | Carlton . |
| 4,523,863 | 6/1985 | Okoshi . |
| 4,621,782 | 11/1986 | Carlson et al. . |
| 4,662,265 | 5/1987 | Becker et al. . |
| 4,687,167 | 8/1987 | Skalka et al. . |
| 4,776,284 | 10/1988 | McIntosh . |
| 4,819,002 | 4/1989 | Reboullet . |
| 4,958,790 | 9/1990 | Nix et al. . |
| 4,965,425 | 10/1990 | Towsend . |
| 4,997,292 | 3/1991 | Klimkovsky et al. . |
| 5,058,840 | 10/1991 | Moss et al. . |
| 5,079,789 | 1/1992 | Jandrakovic . |
| 5,098,053 | 3/1992 | Cotterill . |
| 5,102,084 | 4/1992 | Park . |
| 5,174,224 | 12/1992 | Nagy et al. . |
| 5,209,576 | 5/1993 | Kasai . |
| 5,219,136 | 6/1993 | Hassel et al. . |
| 5,261,200 | 11/1993 | Sasaki et al. . |
| 5,329,825 | 7/1994 | Askins . |

FOREIGN PATENT DOCUMENTS 544928  10/1922  France ..................... 384/610

*Primary Examiner*—Lenard A. Footland
*Attorney, Agent, or Firm*—Merchant, Gould, Smith, Edell, Welter & Schmidt, P.A.

[57] ABSTRACT

A thrust bearing for bearing a load along a force vector includes at least two roller elements in rolling contact with one another and arranged along the force vector such that the load is borne through the roller elements. The roller elements are retained within a retainer such that they remain aligned along the force vector while subjected to loads. The retainer used to house the roller elements may be designed to abut the roller elements at minimum points of contact, or alternatively to distribute the load borne by one or both of the roller elements across a greater surface area. One application of the preferred thrust bearings is in an apparatus such as a keyboard support for reducing repetitive stress injuries. A main disk is rotatably coupled to a base and supports a support member on a plurality of the thrust bearings. Rotation of the main disk varies the tilt of the support member relative to the base, thereby adjusting the position of a keyboard supported on the support member relative to an operator.

20 Claims, 5 Drawing Sheets ature.# THRUST BEARING AND USE OF SAME WITH APPARATUS FOR REDUCING REPETITIVE STRESS INJURY This is a Divisional of application Ser. No. 08/514,660, filed Aug. 14, 1995, now U.S. Pat. No. 5,657,956, which application(s) are incorporated herein by reference.

FIELD OF THE INVENTION

The invention is directed to a thrust bearing for bearing a load along a force vector, and more particularly, is directed to a thrust bearing having a pair of roller elements in rolling contact with one another along the force vector. Moreover, the invention is directed to an apparatus for reducing repetitive stress injury incorporating such thrust bearings to support a movable work surface thereon.

BACKGROUND OF THE INVENTION

Thrust bearings have enumerable applications where a force must be borne along a force vector between two members, with one member movable relative to the other. Conventional thrust bearings typically include a plurality of roller elements such as ball bearings housed within races formed in a pair of opposing members. The opposing members are movable relative to one another by virtue of the rolling contact of the plurality of roller elements rotating within the races formed between the opposing members.

Due to the relatively large forces which are borne by thrust bearings, reduction in the friction within the bearings is critical to ensure relative movement of the opposing members while under load. For example, U.S. Pat. No. 4,523,863 to Okoshi discloses a thrust ball bearing using multiple ball bearings and having opposing races with slightly larger cross-sectional radii to minimize contact, and therefore friction, between the balls and the races.

U.S. Pat. No. 2,244,434 to Shaw discloses a supporting roller bearing wherein a pair of cylindrical rollers are supported by three sets of anti-friction bearings, with each roller element supporting two of the three sets of bearings. However, since each roller element engages two anti-friction bearings, increased friction is exhibited within the system. In addition, the offset nature of the rollers relative to the anti-friction bearing applies lateral forces to the rollers, which also increases the friction present in the system.

U.S. Pat. No. 4,297,913 to Garbo discloses a remote control having a push-pull blade with captive rolling elements. The rolling elements are in contact with one another as well as with outer races formed within a tubular sheath. The rolling elements are retained within openings in the push-pull blade such that they are maintained in rolling contact with one another. However, Garbo is not directed to a thrust bearing arrangement. The primary forces exhibited upon the system are along the longitudinal axis of the tubular sheath, and consequently the rolling elements are arranged along an axis which is orthogonal to the force vector. In addition, the manner in which the rolling elements are retained by the push-pull blade may not adequately house the rolling elements in operation, and may introduce additional friction in certain applications.

Therefore, a substantial need exists for a thrust bearing arrangement which is capable of permitting the relative movement of two members while bearing a load along a force vector applied between the members. In addition, a substantial need exists for such a bearing arrangement which exhibits reduced friction in a simple and economical manner.

SUMMARY OF THE INVENTION

The invention addresses these and other problems associated with the prior art in providing a thrust bearing for bearing a load along a force vector, in which a pair of roller elements are placed in rolling contact with one another and are arranged along the force vector. By arranging the roller elements in this manner, the load is borne through the roller elements and lateral forces applied to the roller elements will not substantially increase the friction exhibited within the system.

One particular application of the invention is in an apparatus for reducing repetitive stress injury, whereby a plurality of thrust bearings support a support surface in such a manner that movement of the thrust bearings relative to the support surface imparts movement of at least a portion of the support surface in a direction generally along the force vector (e.g., by tilting the support surface). When an operator performs a repetitive task on or in conjunction with the support surface, the apparatus may be used to automatically vary the orientation of the support surface over time relative to the operator, thereby reducing the repetitiveness of the task.

Therefore, according to one aspect of the invention, a thrust bearing is provided for bearing a load along a force vector. The thrust bearing includes at least two roller elements in rolling contact with one another and arranged along the force vector such that the load is borne through the roller elements, and a retainer retaining the roller elements along the force vector under load.

In accordance with another aspect of the invention, a thrust bearing is provided for bearing a load along a force vector between first and second load bearing members and for permitting relative movement of a third member between the first and second members in a direction generally orthogonal to the force vector. The thrust bearing includes first and second stacked roller elements retained in the third member. The roller elements are in rolling contact with one another and with the first and second members, respectively, and are arranged in the third member along the force vector to bear the load between the first and second members.

According to another aspect of the invention, an apparatus is provided for reducing repetitive stress injuries. The apparatus includes a base; a support surface for supporting a load along a force vector and from which an operator performs a repetitive task; and moving means for moving at least a portion of the support surface relative to the base in a direction generally along the force vector, the moving means including a rotatable member coupled to the base and having a plurality of thrust bearings supporting the support surface on the base, each thrust bearing including top and bottom ball bearings in rolling contact with one another and arranged in a direction generally along the force vector, the top ball bearing in rolling contact with the support surface and the bottom ball bearing in rolling contact with the base.

According to an additional aspect of the invention, a keyboard support is provided, which includes a base having at least two idler gears rotatably mounted thereon; a drive motor mounted on the base and having a drive gear rotated thereby; a main gear rotatably coupled to the base between the drive gear and the idler gears, the main gear including first, second and third thrust bearings supporting the main gear on the base, each thrust bearing including first and second ball bearings in rolling contact with one another and arranged generally along a force vector along which the thrust bearing supports a load, and the first thrust bearing being taller than and disposed at a different radius from the second and third thrust bearings; and a support surface for supporting a keyboard, the support surface being tiltably mounted to the base through a flexible member and supported on the first, second and third thrust bearings, the flexible member resisting rotation of the support surface relative to the base, and the support surface including an annular profile member mounted thereto to support the support surface on the first thrust bearing.

These and other advantages and features, which characterize the invention, are set forth in the claims annexed hereto and forming a further part hereof. However, for a better understanding of the invention, and the advantages and objectives attained through its use, reference should be made to the Drawing, and to the accompanying descriptive matter, in which there is described preferred embodiments of the invention.

DETAILED DESCRIPTION OF THE PREFERRED EMBODIMENTS

Figure 1:
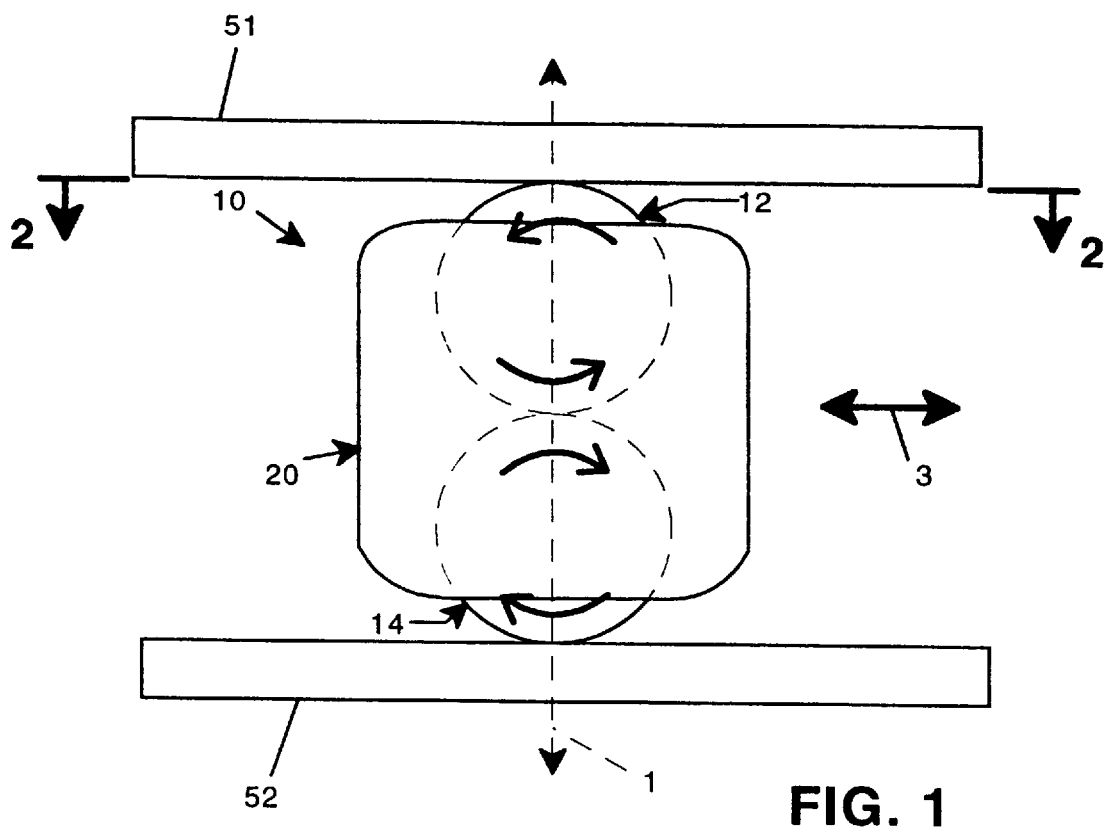
FIG. 1 is a side elevational view of a first preferred thrust bearing consistent with the principles of the invention, shown supporting a first member on a second member.

Turning to the Drawing, wherein like parts are denoted by like numbers throughout the several views, FIG. 1 shows a preferred thrust bearing 10 which supports a first member 51 on a second member 52 to bear a force having at least a component of which is borne along a force vector 1. The preferred thrust bearing includes a pair of roller elements 12 and 14 placed in rolling contact with one another along force vector 1, and retained in such an orientation by a retainer 20. In this configuration, thrust bearing 10 is permitted to move relative to members 51 and 52 along direction 3, which is generally orthogonal to vector 1.

By virtue of the rolling contact between roller elements 12 and 14, a movement of thrust bearing 10 in direction 3 causes the relative rotation of roller elements 12 and 14. The top of roller element 14 rolls in the same direction as the bottom of roller element 12, thereby reducing the friction between these elements. Moreover, it is believed that the friction therebetween is also reduced since retention of the roller elements by retainer 20 takes advantage of the "toppling" effect of the top roller element 12 being supported on the bottom roller element 14. In general, a rolling element disposed on top of another rolling element has a natural tendency to topple, or roll off of the other roller element. It is believed that by retaining the roller elements, the direction in which the top element will topple is controlled, and this tendency is used to the bearing's mechanical advantage. It is also believed that the minimal points of contact between the roller elements, the retainer and the first and second members (as discussed below) significantly reduces the friction exhibited by the preferred thrust bearings.

Figure 3:
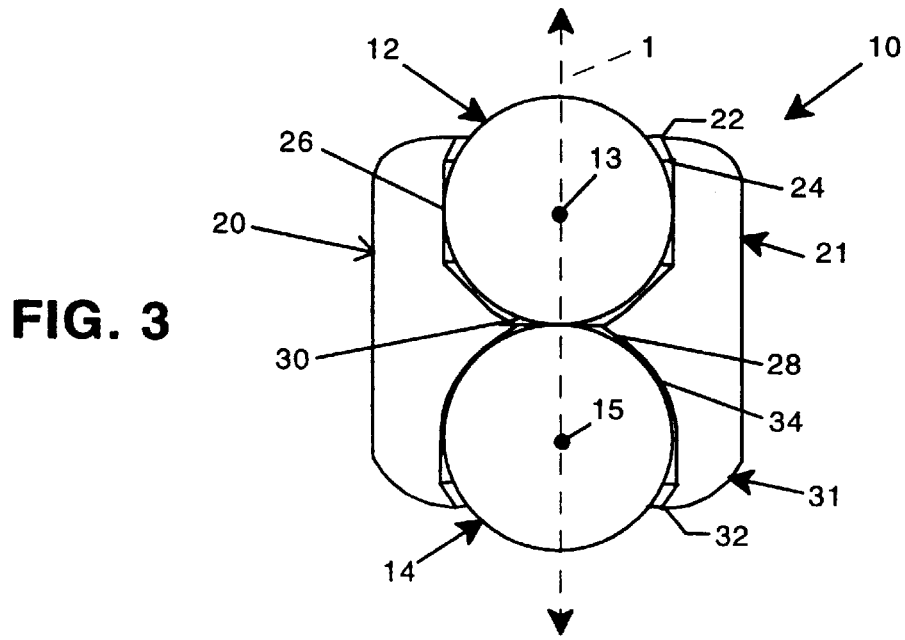
FIG. 3 is a side cross-sectional view of the first preferred thrust bearing, taken through line 3—3 of FIG. 2.

Turning to FIG. 3, roller elements 12 and 14 are preferably aligned with their centers of rotation 13, 15 aligned along force vector 1. The roller elements are preferably spherical balls, although other shapes, such as cylinders, may also be used. However, it has been found that spherical balls are preferred because the balls are permitted to "float" in any direction relative to one another and minimize any friction therebetween.

Roller elements 12 and 14 are preferably constructed of steel or any other metal, plastic, ceramic, or other material commonly used for ball bearings and the like. In addition, more than two roller elements may be used or "stacked" in this arrangement, although the addition of roller elements will in general increase the friction and thereby reduce the performance of the thrust bearing.

Retainer 20 retains roller elements 12 and 14 along the force vector while under load. Retainer 20 preferably includes a top portion 21 and a bottom portion 31, for respectively retaining the top and bottom roller elements 12 and 14. Top and bottom portions 21 and 31 include interior walls 24, 34 which define inner chambers for respectively retaining or housing roller elements 12 and 14. The inner chambers are connected by an interior opening 30 to permit roller elements 12 and 14 to be placed in rolling contact with one another. The inner chambers connected through opening 30 may simply be formed as a single cylindrical chamber. Preferably, however, an inner ridge 28 segregates the inner chambers and defines interior opening 30.

Figure 4:
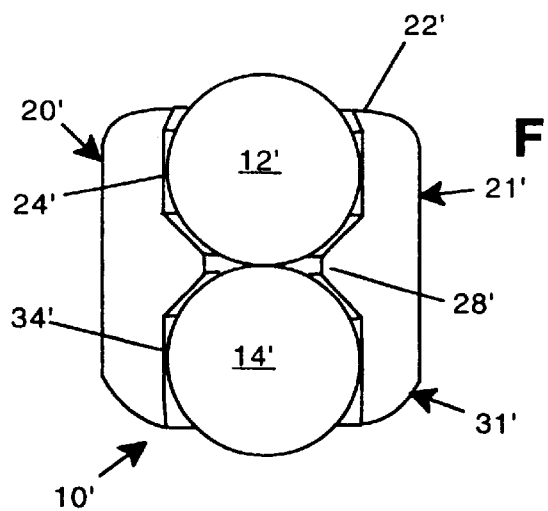
FIG. 4 is a cross-sectional view of a second preferred thrust bearing consistent with the principles of the invention.
Figure 5:
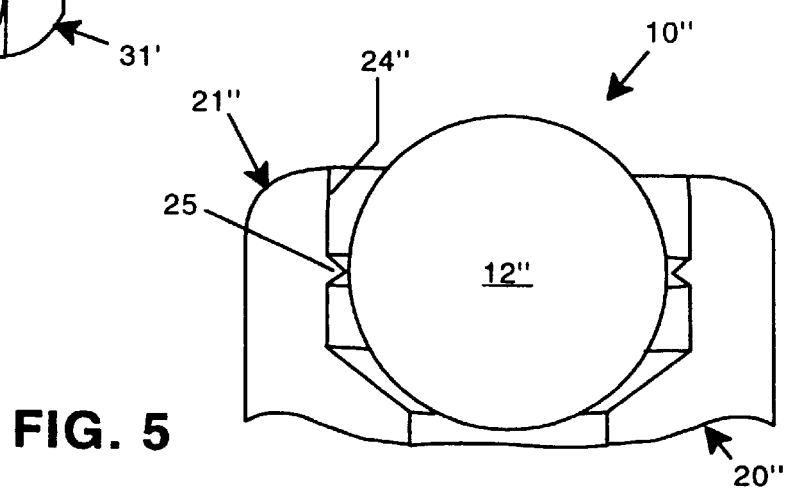
FIG. 5 is a partial cross-sectional view of a third preferred thrust bearing consistent with the principles of the invention.

Retainer 20 preferably houses roller elements 12 and 14, and to this extent, it may be preferable to include narrowed ridges, e.g. ridges 22 and 32, which define external openings having diameters smaller than those of the respective roller elements, such that the roller elements may be snapped into the retainer, but will not be easily removable therefrom. Alternatively, the narrowed ridges may be eliminated in either top or bottom portion 21 or 31 (e.g., as shown in FIGS. 4 and 5) should the surrounding structure in which the thrust bearing is used sufficiently maintain its respective roller element within retainer 20. In addition, the retainer may be made of multiple parts, e.g., using removable caps which may be removed to permit insertion or removal of a roller element from the retainer.

In general, the primary function of retainer 20 is to support roller elements 12 and 14 in a lateral direction (orthogonal to the force vector). Therefore, retention of the roller elements along the force vector need not be provided by retainer 20.

Inner wall 24 of top portion 21 preferably has a cross-sectional curvature profile from top to bottom having a radius which is greater than that of roller element 12 (which may also include a profile which is curved opposite to the roller element, i.e., a "negative" radius relative to the roller element). In the preferred embodiment, inner wall 24 is linear in cross-section (i.e., an infinite radius). By providing a larger radius for the inner wall of this portion, contact between inner wall 24 and roller element 12 is minimized. In the preferred embodiment where inner wall 24 is linear in cross-section, this results in contact between roller element 12 and inner wall 24 being substantially a single point from top to bottom, defining a perimeter extending along the maximum diameter of roller element 12. In general, it is desirable to minimize any contact between roller element 12 and retainer 20 to minimize friction, which is adequately served by this preferred construction.

Alternatively, as shown on thrust bearing 10" in FIG. 5, a separate ridge 25 may be provided on inner wall 24" in the upper portion 21" of retainer 20". This ridge 25 preferably contacts roller element 12" along its largest perimeter or width, thereby providing a minimum amount of contact between the roller element and retainer 20". In certain applications, however, a linear wall without a separate ridge may be preferred since any wear of the retainer or the roller element may displace the roller element relative to ridge 25, such that the ridge no longer contacts the point of maximum perimeter of the roller element and the roller element is permitted to rattle within the retainer.

In either configuration, it may be seen that the top roller element is in contact with only four points through its cross-section. Two points of contact abut the inner wall of the retainer and are aligned orthogonal to the force vector through the center point of the roller element (i.e., along the maximum perimeter of the roller element). The other two points of contact abut the other roller element and the member which the thrust bearing supports (e.g., first member 51 in FIG. 1), and are aligned along the force vector through the center point of the roller element. Both lateral and vertical load forces applied to the thrust bearing are consequently borne through the center point of the roller element.

Returning to FIG. 3, inner wall 24 is preferably sized to contact roller element 12 substantially around its perimeter (i.e., the diameter of inner wall 24 is substantially the same as roller element 12). This is provided to prevent any rattling or lateral displacement of the roller element within retainer 20. However, it will be appreciated that some spacing may also be provided in the alternative.

The inner wall 34 of bottom portion 31 preferably has a cross-sectional curvature profile from top to bottom with a radius that is substantially matched with that of the bottom ball bearing or rolling element 14. Moreover, the inner wall preferably continues on to the lower surface of ridge 28 to form a contiguous surface. The configuration shown in FIG. 3 is of unique applicability to a plastic or composite retainer design, since the load borne by the bottom rolling element 14 is distributed across the upper portion of inner wall 34. This provides a maximum surface area upon which to bear a force, thereby increasing the load bearing capacity of the plastic retainer.

In the alternative, especially for retainers constructed of metal or other stronger or more wear resistant materials, the inner wall circumscribing the lower rolling element may be constructed to minimally contact the rolling element. For example, as shown in FIG. 4, an alternate thrust bearing 10' includes a retainer 20' having a lower portion 31' with an inner wall 34' which has a cross-sectional curvature profile from top to bottom with a radius that is larger than lower rolling element 14'. This is similar in operation to top portion 21', wherein rolling element 12' contacts inner wall 24' along a maximum perimeter of the rolling element. An optional ridge 28' also segregates the two inner chambers formed by walls 24' and 34' in this design.

The outer structure of the retainer will typically vary depending upon the particular application in which the thrust bearing is used. For example, retainer 20 shown in FIGS. 1–3 has an outer cylindrical wall such that the retainer may be inserted into a separate sleeve in operation. However, it will be appreciated that other structure may be provided on the retainer depending upon the application, or that the retainer may be formed at an integral part of another member.

The preferred thrust bearings generally do not require any lubrication for most applications. However, any known lubricants may be used in some applications if desired.

The preferred thrust bearings may be used in a number of applications wherever relative movement between members under load is desired, e.g. in robotics, manufacturing applications, automation applications, animated displays, etc.

For example, FIG. 1 shows thrust bearing 10 disposed between a first load bearing member 51 and a second load bearing member 52. The retainer 20, which functions as a third member, is permitted to move relative to both members 51 and 52 in a direction which is generally orthogonal to the force vector, e.g., in direction 3. During this movement, all contacting surfaces between roller elements 12 and 14 and members 51 and 52 cooperatively move in the same general direction, thereby minimizing any frictional effects between the surfaces.

One particular benefit of this configuration is that movement of the third member between the first and second members may be used to impart movement of the first member in a direction generally along the force vector. Several examples of this application are illustrated in FIGS. 6–10.

Figure 6:
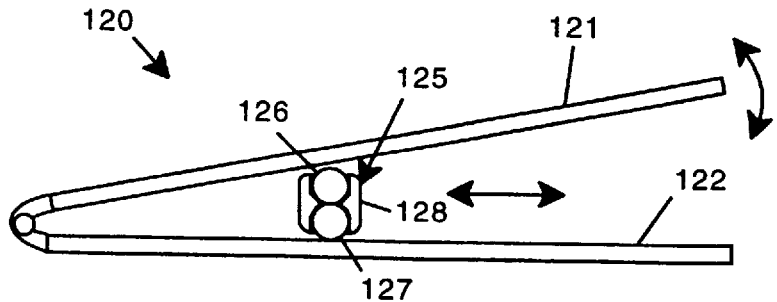
FIG. 6 is a functional side elevational view of one exemplary apparatus suitable for use with the preferred thrust bearings, wherein a top member is selectively inclined relative to a bottom member.

For example, FIG. 6 shows one apparatus 120 which may be used as a lift for inclining a first member 121 relative to a second member 122. Members 121 and 122 may be hingedly connected to one another, with member 121 supported on a thrust bearing 125. Bearing 125 may include ball bearings, or alternatively a pair of rolling cylinders 126 and 127 housed within a retainer 128. Movement of retainer 125 in a direction generally orthogonal to the force vector tilts member 121 up or down, thereby providing a lifting action. Another member (not shown) may also be coupled to member 121 to translate into a purely linear motion along the force vector.

Figure 7:
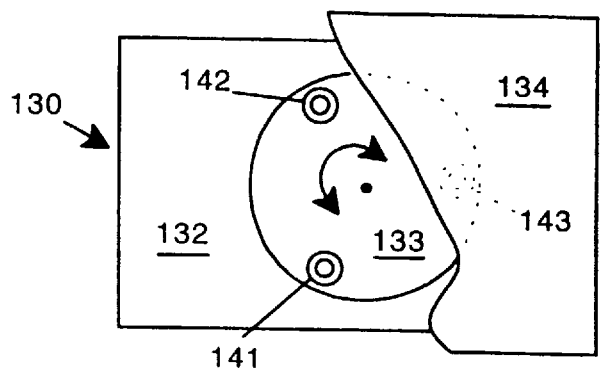
FIG. 7 is a functional top plan view of another exemplary apparatus suitable for use with the preferred thrust bearings with parts thereof cut away, wherein a top member is selectively elevated relative to a bottom member.
Figure 8:
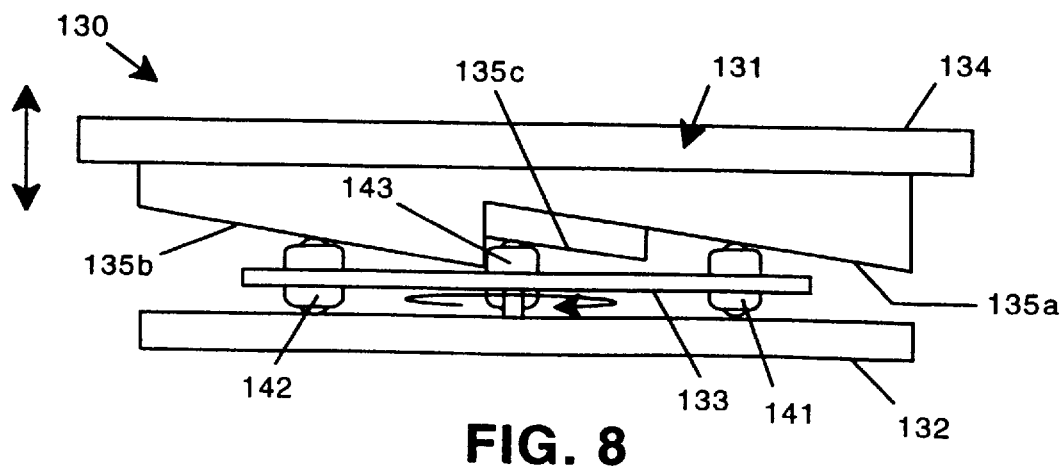
FIG. 8 is a functional side elevational view of the apparatus of FIG. 7.

FIGS. 7 and 8 illustrates another application suitable for use with the preferred thrust bearings. An apparatus 130 includes first member 131 supported on a third member 133 which is rotatably mounted to a second member 132. First member 131 includes a top surface 134 and a bottom surface formed by surfaces 135a, 135b and 135c. Surfaces 135a–c respectively engage thrust bearings 141, 142, and 143 which are mounted to third member 133. Moreover, surfaces 135a–c are identically configured and evenly spaced about the perimeter of first member 131. Surfaces 135a–c have matched degrees of inclination such that, upon rotation of third member 133, top surface 134 of member 131 will raise and lower in a purely linear motion. It will be appreciated that three points define a plane, and therefore as few as three thrust bearings may be used to support member 131, although more may be used if desired. Correspondingly, a greater number of bottom surfaces such as surfaces 135a–c would be required to match the number of thrust bearings used. Furthermore, the degrees of inclination of surfaces 135a–c may be varied to control both the rate and the amount of displacement of first member 131 along the force vector. Furthermore, the surfaces may have different contours to provide more complex motion. Also, member 133 may only rotate through a narrow arc in one or both directions such that each thrust bearing will circumscribe only one of surfaces 135a–c.

Figure 9:
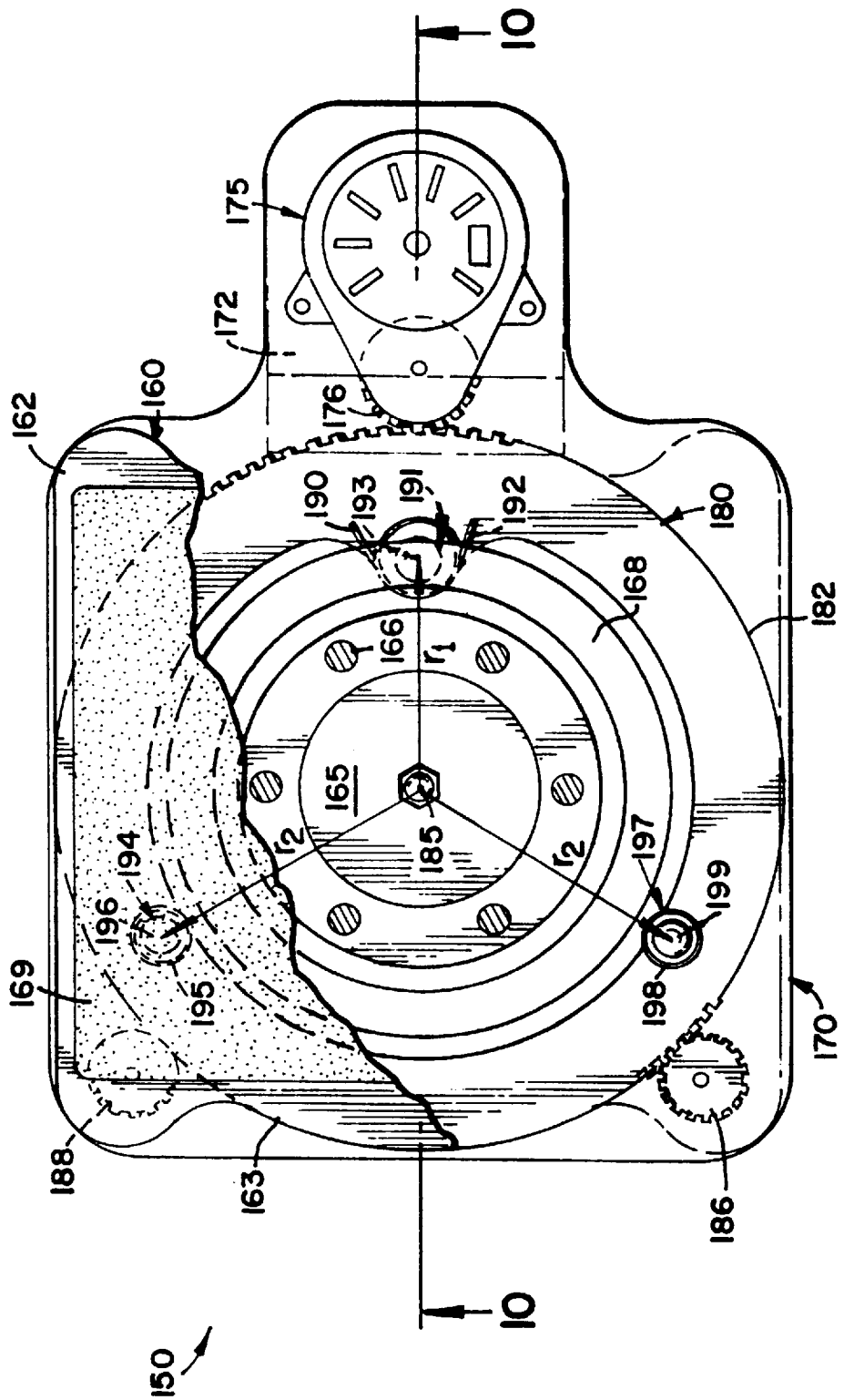
FIG. 9 is a top plan view of a preferred apparatus for reducing repetitive stress injury which utilizes preferred thrust bearings consistent with the invention, with portions of the housing and the top surface of the support member cut away.
Figure 10:
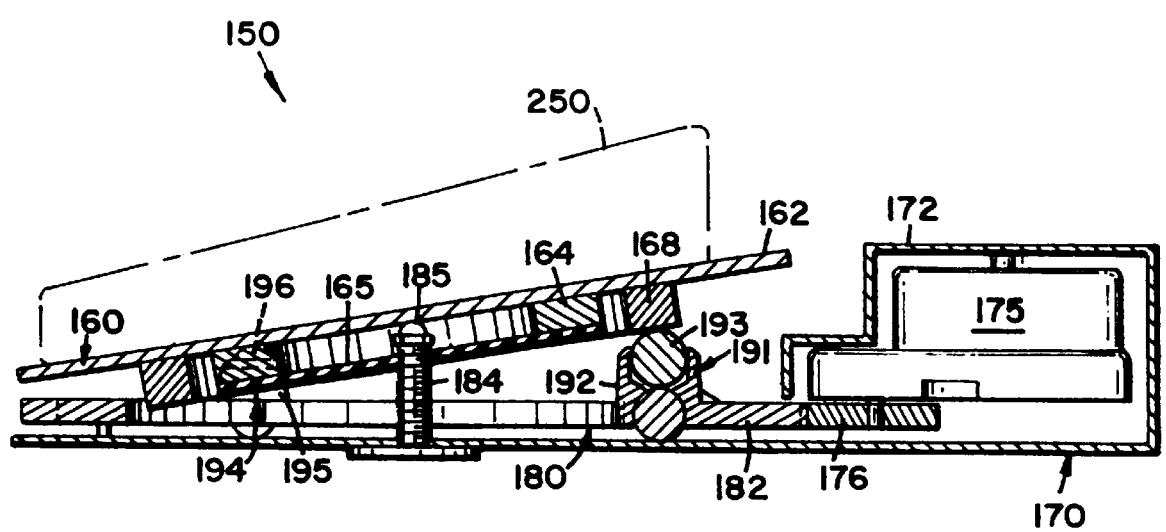
FIG. 10 is a cross-sectional view of the apparatus of FIG. 9, taken through line 10—10.

FIGS. 9 and 10 illustrate another apparatus 150 which may be used to reduce repetitive stress injuries and the like, where in general rotation of a third or rotatable member 182 in a moving mechanism 180 between a first, or support, member 160 and a second member or base 170 moves at least a portion of the support member relative to the base in a direction generally along the force vector (e.g., by imparting a tilting movement to the support member). For the purposes of the invention, a direction "generally along the force vector" should be understood to include directions coincidental with the force vector, as well as directions parallel to the force vector.

One particular application of this structure is in a keyboard support or stand for reducing repetitive stress injuries associated with typing on a keyboard supported thereby. Various keyboard support designs providing this function a-re disclosed in U.S. Ser. No. 08/376,584, filed Jan. 23, 1995 by Robert J. Crosson, which is incorporated by reference herein. However, apparatus 150 generally includes three thrust bearings consistent with the invention in substitution for the pair of wedges and tracks of ball bearings disclosed in the aforementioned application, thereby substantially reducing the number of parts and the complexity of the device, while retaining minimal friction during rotations even under heavy load.

Support member, or surface, 160 of apparatus 150 preferably supports a keyboard (e.g., keyboard 250 shown in phantom in FIG. 9) and includes a top surface 162 which is preferably generally square in shape with front and back edges cut away as at 163 to permit the member to pivot forward or backward without contacting any surrounding structure in the apparatus. In the preferred embodiment, support member 160 generally takes the form of an "I" beam, to provide additional support for a keyboard from front to back. In addition, to secure a keyboard to the support member, suitable fastening means, such as patches of hook and loop fastener 169, may be disposed on top surface 162 (with matching hook and loop fastener material being similarly secured to the underside of a keyboard). Similar cut outs to those on the front and back edges may be provided on the side edges if desired, and in general, the contour of the support member may vary depending upon aesthetic and other concerns.

Support member 160 includes a backing ring 164 which is secured to the underside of the top surface with fasteners (e.g., screws 166) or in other manners known in the art (e.g., using adhesives, or by being integrally molded therein). In addition, a flexible boot or member 165 (preferably formed of rubber) is secured to backing ring 164. Support member 160 is secured to base 170 by securing a fastener 185 to a threaded axle 184 projecting through flexible boot 165 such that the member is tiltably mounted (i.e., is allowed to tilt relative to the base) but is not permitted to rotate about the axle.

Support member 160 and base 170 are preferably constructed of sheet metal or another suitable material such as a plastic or other metals. It will be appreciated that the specific design of these members may vary depending upon aesthetic and/or functional considerations.

Moving mechanism 180 includes a main gear or disk 182 which functions as a rotatable member having a plurality of teeth disposed about its perimeter. Disk 182 houses three supporting thrust bearings 191, 194 and 197, and is retained between a drive gear 176 on drive motor 175 and a pair of idler gears 186 and 188. Drive motor 175 is preferably hidden by a housing 172 on base 170, and is preferably a low speed motor such as a timing motor, which, in conjunction with the relative sizes of drive and main gears 176 and 182, provides an extremely slow rotation of disk 182 (preferably generating a nearly or fully imperceptible movement of support member 160). The preferred motor is a Model 4 timing motor available from Mallory having a speed of 1 RPM and torque of 120 Oz-inches. Motor 175 also includes gear reduction, preferably 10:1, to rotate disk 182 at 0.1 RPM. By virtue of the reduced friction provided by the preferred thrust bearings, a low torque motor such as a timing motor is still capable of rotating disk 182 even when a great load is applied to support member 160. It will be appreciated, however, that other motors and gear reductions may also be used, and further that different manners of supporting and driving disk 182, including the use of belts, chains, other gear arrangements, etc., may also be used.

Figure 2:
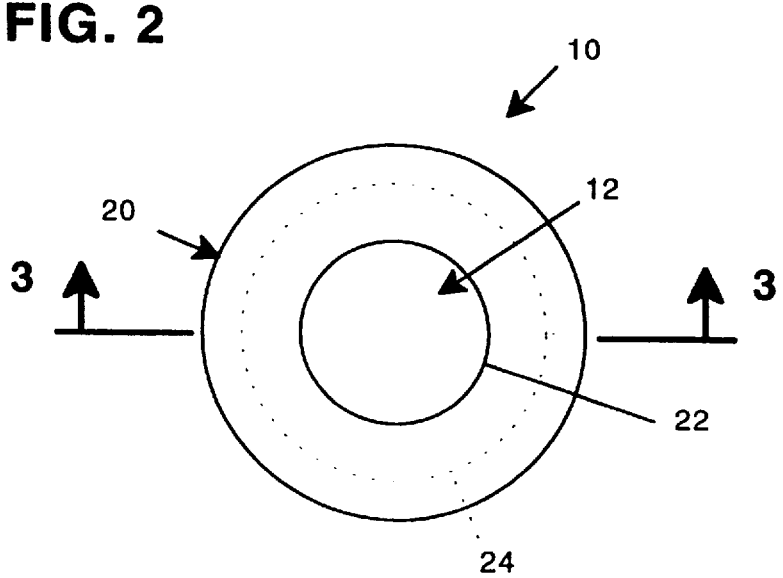
FIG. 2 is a top plan view of the first preferred thrust bearing, taking along line 2—2 of FIG. 1.

Bearings 191, 194 and 197 each include retainers 192, 195 and 198 which are preferably-formed integrally in disk 182 (e.g., by molding disk 182 from plastic), and including suitable internal chambers (e.g., as shown in FIGS. 1–3). The ball bearings in each thrust bearing are aligned or stacked in along a direction which is generally along the force vector applied by a load supported on the support member(e.g., the direction of gravity when the base is placed on a level surface).

It may be preferable to include external surfaces on the retainers which are somewhat conical in shape to avoid hitting any surrounding structure on support member 160 when it is tilted, as shown in FIGS. 9 and 10. In addition, it may be desirable to include additional supporting structure (e.g, braces 190 on retainer 192) to increase the rigidity of the apparatus.

Bearing 191 is preferably relatively taller than (i.e. has a greater length along the force vector) and disposed along a different radius $r_1$ from bearings 194 and 197 (at radius $r_2$). By making this bearing taller (e.g., by using larger ball bearings), the plane defined by the top ball bearings 193, 196 and 199 is inclined relative to horizontal such that rotation of disk 182 varies the tilt angle of this defined plane, and therefore support member 160. In addition, by placing this bearing at a different radius than the other bearings (such that it travels along a different arc), bearing 191 may support a separate annular profile member 168 secured to the underside of support member 160, while bearings 194 and 197 support member 160 directly. This provides additional tilt to member 160, and also permits a customized tilt profile to be developed for support member 160 to follow.

Profile member 168 is preferably removably secured to support member 160 (e.g., using screws or bolts, snap in attachment-, etc.), although member 168 may also be permanently secured to the support member. However, by making the member removable, different profile members may be installed for different applications.

Figure 11:
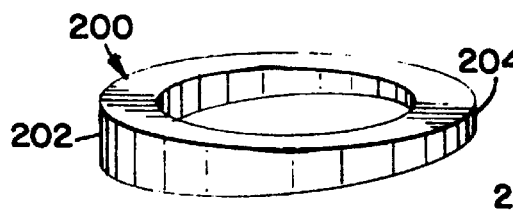
FIG. 11 is a perspective view of one alternative profile member suitable for use in the apparatus of FIGS. 9 and 10.
Figure 12:
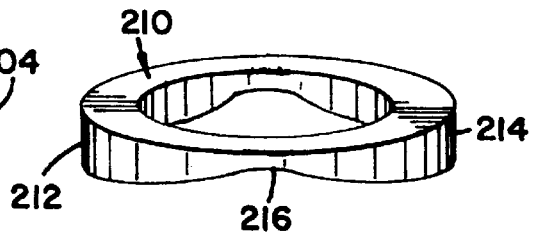
FIG. 12 is a perspective view of another alternative profile member suitable for use in the apparatus of FIGS. 9 and 10.

For example, profile member 168 in FIG. 10 has a constant contour and provides a generally constant tilt profile. Two alternative profile members are shown in FIGS. 11 and 12. Profile member 200 in FIG. 11 is wedge shaped, being generally thicker at the front point 202 than the back point 204 (where front point 202 is installed proximate the front of apparatus 150—distal from the drive motor). This design may be useful in conjunction with keyboards that are themselves tilted, since the wedge shape tends to minimize the amount the support surface is tilted forward (i.e., down in the front) relative to the backward tilting of the support member.

Profile member 210 in FIG. 12 has a "reverse wedge" shape where the front and back points 212 and 214 are thicker than the side points 216. This design has the effect of reducing the degree of tilt from side to side relative to the front to back tilt of the support member. It will be appreciated that a keyboard is generally longer from side to side than from front to back, and thus a similar degree of tilt from side to side will displace the outer points of a keyboard a greater distance than will a similar degree of tilt from front to back. Accordingly, by reducing the degree of tilt from side to side, the actual displacement of the keyboard may be more consistent in all directions. Other profile member designs may be used in the alternative to provide different tilt profiles.

Various modifications to the preferred apparatus may be made consistent with the invention. For example, bearings 191, 194 and 197 may all be similarly or differently sized to one another, and may be disposed at similar or-different radii. Moreover, more than three bearings may be used, and any bearing may rely on a common or a separate profile member (or none) to generate different tilt profiles. Other modifications will be apparent to one skilled in the art.

The above examples are illustrative of several of the many uses of the preferred thrust bearings in providing relative movement between two members subjected to load. However, the above examples are merely illustrative, and one skilled in the art will appreciate that many different applications may be foreseen for the preferred bearings. Moreover, one skilled in the art will appreciate that various modifications and changes may be made to the preferred embodiments without departing from the spirit and scope of the invention. Therefore, the invention lies in the claims hereinafter appended.

What is claimed is:

1. A thrust bearing for bearing a load along a force vector, the thrust bearing comprising:
   (a) at least two rolling elements in rolling contact with one another and arranged along the force vector such that the load is borne through the roller elements; and
   (b) a retainer retaining the roller elements along the force vector under load.

2. The thrust bearing of claim 1, wherein the rolling elements are generally cylindrical in shape.

3. The thrust bearing of claim 1, wherein the rolling elements are ball bearings.

4. The thrust bearing of claim 3, wherein the ball bearings are formed of steel.

5. The thrust bearing of claim 3, wherein the at least two rolling elements include top and bottom ball bearings, and wherein the retainer includes top and bottom portions for respectively retaining the top and bottom ball bearings, the top and bottom portions of the retainer defining inner chambers connected by an interior opening such that the ball bearings contact one another through the interior opening.

6. The thrust bearing of claim 5, wherein the top and bottom portions each include an external opening defined by a narrowed ridge, the external opening having a diameter smaller than that of its respective ball bearing to restrict removal of the ball bearing from the retainer.

7. The thrust bearing of claim 5, wherein the top portion includes an inner wall having a curvature from top to bottom with a radius which is greater than that of the top ball bearing; whereby contact between the inner wall and the top ball bearing is minimized.

8. The thrust bearing of claim 7, wherein the inner wall of the top portion includes a ridge projecting inward to contact the top ball bearing about a perimeter defined along the maximum diameter of the top ball bearing.

9. The thrust bearing of claim 5, wherein the bottom portion includes an inner wall having a curvature from top to bottom with a radius which is greater than that of the bottom ball bearing; whereby contact between the inner wall and the bottom ball bearing is minimized.

10. The thrust bearing of claim 5, wherein the retainer includes an inner ridge defining the interior opening and segregating the inner chambers of the top and bottom portions, and wherein the bottom portion includes an inner wall with an upper portion with a curvature from top to bottom having a radius which is substantially the same as that of the bottom ball bearing; whereby the load borne by the bottom ball bearing is distributed across the upper portion of the bottom portion inner wall.

11. The thrust bearing of claim 10, wherein the inner ridge between the top and bottom portions is contiguous with the upper portion of the bottom portion inner wall to bear a portion of the load borne by the bottom ball bearing.

12. The thrust bearing of claim 1, wherein the retainer is plastic.

13. The thrust bearing of claim 1, wherein the retainer is metal.

14. The thrust bearing of claim 1, wherein the top ball bearing contacts the retainer solely about a perimeter defined along the maximum diameter of the top ball bearing.

15. A thrust bearing for bearing a load along a force vector between first and second load bearing members and for permitting relative movement of a third member between the first and second members in a direction generally orthogonal to the force vector, the thrust bearing comprising first and second stacked rolling elements retained in the third member, the rolling elements being in rolling contact with one another and with the first and second members, respectively, and the roller elements being arranged in the third member along the force vector to bear the load between the first and second members.

16. The thrust bearing of claim 15, wherein movement of the third member relative to the second member imparts movement of the first member along the force vector.

17. The thrust bearing of claim 15, wherein the first and second roller elements are ball bearings, and wherein the ball bearings are retained in the third member by a retainer including top and bottom portions for respectively retaining the first and second ball bearings.

18. The thrust bearing of claim 17, wherein the top and bottom portions of the retainer define inner chambers connected by an interior opening defined by an interior ridge such that the ball bearings contact one another through the interior opening, the top portion including:
   (a) a narrowed ridge defining an external opening having a diameter smaller than that of the first ball bearing to restrict removal of the ball bearing from the retainer; and (b) an inner wall having a curvature from top to bottom with a radius which is greater than that of the top ball bearing to minimize contact with the ball bearing.

19. The thrust bearing of claim 18, wherein the retainer is plastic, and wherein the bottom portion includes an inner wall having an upper portion with a curvature from top to bottom having a radius which is substantially the same as that of the second ball bearing; whereby the load borne by the second ball bearing is distributed across the upper portion of the bottom portion inner wall.

20. The thrust bearing of claim 18, wherein the retainer is metal, and wherein the bottom portion includes an inner wall having a curvature from top to bottom with a radius which is greater than that of the second ball bearing; whereby contact between the inner wall and the second ball bearing is minimized.

* * * * *